United States Patent [19]

Schaeffer et al.

[11] 3,725,674

[45] Apr. 3, 1973

[54] IMPULSE NOISE BLANKER INCLUDING BROADBAND LEVEL SENSING

[75] Inventors: Dennis R. Schaeffer, Arlington Heights; Larry R. Wright, Mount Prospect, both of Ill.

[73] Assignee: Motorola, Inc., Franklin Park, Ill.

[22] Filed: July 8, 1971

[21] Appl. No.: 160,854

[52] U.S. Cl. ....................307/237, 325/478, 328/165

[51] Int. Cl. ....................H03k 5/08

[58] Field of Search ......328/165, 167; 325/473, 478; 307/237

[56] References Cited

UNITED STATES PATENTS

| | | | |
|---|---|---|---|
| 3,098,972 | 7/1963 | Howard | 325/473 |
| 3,056,087 | 9/1962 | Broadhead et al. | 325/478 |
| 3,304,503 | 2/1967 | Walker et al. | 325/478 |
| 3,495,244 | 2/1970 | La Rosa | 328/167 |
| 2,783,377 | 2/1957 | Wofford | 328/165 |
| 2,259,532 | 10/1941 | Nicholson | 328/165 |

*Primary Examiner*—James W. Lawrence
*Assistant Examiner*—Harold A. Dixon
*Attorney*—Vincent Rauner et al.

[57] ABSTRACT

An impulse noise blanking circuit for decreasing the impulse noise in a receiver includes a level sensing circuit coupled to a stage in the signal path following the blanking elements, and to at least one amplifier stage in the noise amplifiers which amplify the impulse noise signals. The level sensing circuit senses the level of the on-channel and adjacent channel energy in the signal path and develops a level sensing signal. The level sensing signal is coupled to the noise amplifiers to vary the gain in accordance with the level sensing signals, thereby reducing the blanking rate and the resultant receiver degradation due to an excessive blanking rate. The level sensing circuit includes a field effect transistor amplifier stage and feedback circuitry to minimize the production of undesired intermodulation producing signals therein.

9 Claims, 1 Drawing Figure

PATENTED APR 3 1973 3,725,674
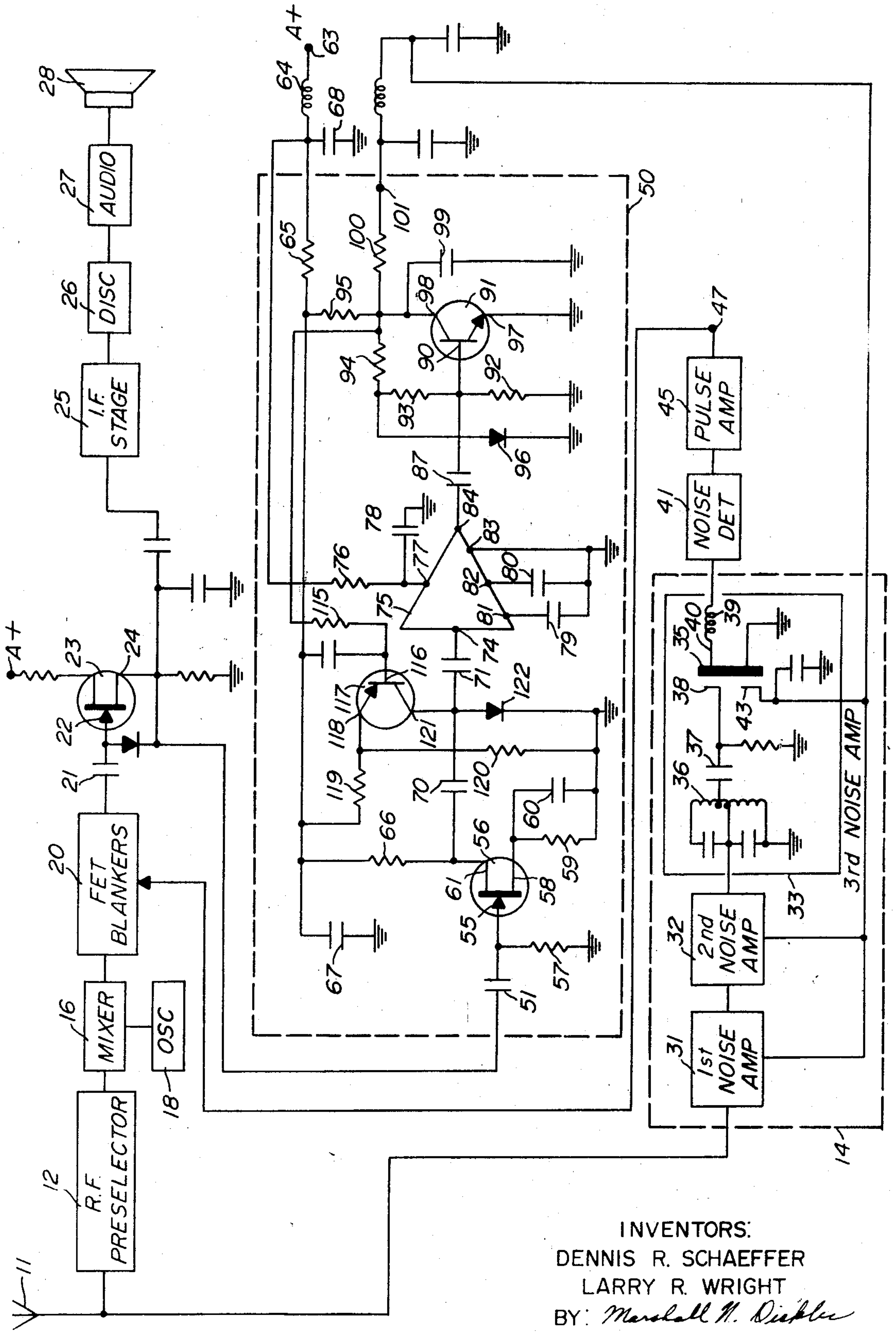
INVENTORS:
DENNIS R. SCHAEFFER
LARRY R. WRIGHT
BY: Marshall N. Dickler
ATTY.

IMPULSE NOISE BLANKER INCLUDING BROADBAND LEVEL SENSING

BACKGROUND

Impulse noise disturbances in the form of large and rapidly changing electro-magnetic fields are produced by certain types of electrically operated machinery, and by lightening. An impulse noise disturbance typically includes spectral components which have large amplitude and which are evenly distributed throughout the frequency range extending from 1 Hz up to several hundred MHz. Thus, impulse noise is capable of temporarily interfering with radio waves within the spectrum which is modulated with desired signal information. This interference may be particularly critical in a mobile communication system wherein impulse noise energy from ignition systems, high voltage leakage, and lightening is coupled to a highly sensitive receiver and appears as an undesirable audio output. Moreover, impulse noise interference is generally more acute in heavily populated areas where there may be a large number of: vehicles utilizing spark ignition, electrical motors, neon signs, and other electrical devices which emit impulse noises.

Noise blanker systems such as that described in co-pending Patent application, Ser. No. 36,717, filed May 13, 1970, now U.S. Pat. No. 3,623,144 issued Nov. 23, 1971 and assigned to the same assignee, employ field effect transistors as blanking elements in the signal path which have a high intermodulation rejection capability, and can operate at an increased blanking rate as compared to prior art blanking circuits. If, however, the impulse noise interference is particularly acute, the blanking elements will operate at a very high rate, chopping segments out of the signals in the signal path. The bandwidth of the signal path will allow acceptance of both on-channel and adjacent channel signals. Blanking or chopping of the adjacent channel signals in the signal path can produce undesireable on-channel energy which will degrade the receiver performance.

Level sensing circuits have been previously employed which sense the presence of a carrier wave signal in the sampling channel noise amplifiers. Other systems may sense the signal level in the signal path and render the sampling channel noise amplifiers inoperative when the signal in the signal path exceeds a predetermined level. Systems which measure the signal level in the signal path are themselves susceptible to high level adjacent channel and on-channel signals. These systems, due to the high level signals coupled thereto, can create undesired intermodulation producing signals that will degrade the receiver performance.

SUMMARY

It is an object of this invention to provide an improved impulse noise blanking circuit which does not have a degrading effect upon the receiver performance when receiving strong signals.

Another object of this invention is to provide an improved noise blanker circuit which senses on-channel and adjacent channel signals within the signal path bandwidth, and reduces the gain of the sampling channel in proportion to the level of these signals.

Yet another object of this invention is to provide a noise blanker circuit which does not substantially contribute intermodulation producing signals.

In practicing this invention, a radio receiver is provided which has a signal path including a first circuit having receiving, amplifying, and mixing circuitry capable of receiving, developing, and passing on-channel and adjacent channel signals along with impulse noise. The signals are coupled through a third circuit comprising a filter network, which includes signal blanking elements, to a second circuit or second amplifying section. A noise channel which includes amplifiers having a variable amplification characteristic, receives and amplifies the impulse noise, and develops blanking pulses therefrom which are coupled to the blanking elements in the filter. The blanking elements are actuated by the blanking pulses, shunting the signals in the signal path to ground potential. This effectively chops holes in the signals at the time when the impulse noise is passing therethrough to eliminate the impulse noise. The blanking rate of the blanking elements varies in accordance with the rate and amplitude of the detected impulse noise.

A level sensing circuit is coupled to the second amplifying section and is responsive to the signal level therein to develop a level sensing signal. This level sensing signal is coupled to the noise channel amplifiers to vary the amplification characteristics of the amplifiers in accordance with the level of the level sensing signal. Decreasing the amplification characteristic of the noise amplifiers decreases the blanking rate of the blanking elements. A reduction in the blanking rate reduces the on-channel energy or splatter which results from the chopping of adjacent channel signals in the signal path.

The level sensing circuit includes a field effect transistor (FET) input amplifier, and feedback circuitry, which minimize the generation of any intermodulation producing signals in the level sensing circuit that could degrade receiver performance in the presence of strong signals.

DESCRIPTION OF THE DRAWING

The single FIGURE of the drawing is a combination schematic and block diagram of the noise blanking circuit of this invention.

DETAILED DESCRIPTION

Referring to the drawing, a combined schematic and block diagram of a frequency modulation (FM) radio receiver including an intermediate frequency (IF) blanker circuit is shown. It will be apparent to one skilled in the art that the blanker circuit could be advantageously employed in other types of receivers and at other locations therein, such as in the radio frequency (RF) stages preceding the mixer stage. Both desired and undesired radio waves, which may be accompanied by impulse noise disturbances, are received by antenna 11 and applied both to RF preselector 12 and noise amplifier 14. Preselector 12, which may be a passive circuit, is tuned to the desired frequency and has at least the necessary bandwidth for receiving the desired signal. Because of the difficulty of obtaining selectivity at very high radio frequencies, some unwanted information bearing signals, particularly adjacent channel signals, may be passed through preselector 12.

The RF noise amplifier 14, which will be further described in a subsequent portion of this application, is utilized to amplify impulse noise, although it will amplify any signal within its bandpass. It may be tuned to a frequency just outside the bandpass of preselector 12 so that there is not a division of the desired signal therebetween. For example, RF preselector 12 might be tuned to 140 MHz and have a bandpass of 3 MHz, and noise amplifier 14 may be tuned to 130 MHz. It is recommended that noise amplifier 14 be tuned to a frequency at least 3 MHz away from the center frequency of preselector 12.

Any radio frequency signals selected by preselector 12 are mixed in mixer circuit 16, which may include a field effect transistor (FET), with a signal from local oscillator 18 to derive the desired IF signal, perhaps along with adjacent channel unwanted signals. Provided that an impulse noise disturbance is not being received by antenna 11, the output of mixer 16 is filtered by the selectivity of FET noise blanking circuit 20, such as that described in co-pending Patent application, Ser. No. 36,717, filed on May 13, 1970, and assigned to the same assignee. The output of blanking circuit 20 is applied through coupling capacitor 21 to gate 22 of FET amplifier 23. The amplified signals are coupled from source 24 of FET amplifier 23 to a selective IF stage 25 which provides most of the selectivity for the receiver, and which selects the desired IF signal. Discriminator 26, which is connected to the output of IF stage 25, demodulates the audio signal from the IF signal. Audio amplifier 27, which is connected to the output of discriminator 25, amplifies and applies the demodulated signal to speaker 28.

If an impulse noise disturbance is received by antenna 11, it will be conducted to both preselector 12 and to noise amplifier 14. Noise amplifier 14, in the embodiment shown, is a three stage amplifier, each stage being substantially the same as the other. Stages 31 and 32 are shown in block diagram form, while stage 33, the third noise amplifier, is shown in schematic diagram representation.

Noise amplifier 33, includes a FET amplifier 35 for amplifying the impulse noise. In this embodiment, FET 35 is a dual gate MOSFET. The impulse noise signals are coupled from second noise amplifier 32 through a portion of coil 36 and DC blocking capacitor 37 to gate 38 of FET 35. The amplified impulse noise signals are coupled from drain 40 through coil 39 to noise detector 41. Gate 43 of FET 35 has a bias voltage applied thereto for controlling the gain of FET 35. Varying the bias voltage at gate 43 will vary the amplification characteristics of FET 35.

The amplified impulse noise is then demodulated in detector 41 and applied to pulse amplifier 45. The detected envelope is amplified and its duration increased by pulse amplifier 45 to provide a noise blanking pulse at output terminal 47. The blanking pulse is utilized to activate FET blanker 20, thereby interrupting all signals passing through the signal channel for the duration of the blanking pulse. As this occurs at the time the impulse noise passes through blanker 20, it prevents the impulse noise disturbance from being reproduced by the receiver speaker and degrading the reproduced audio quality.

A level sensing circuit 50 is provided which acts to vary the amplification characteristics of noise amplifier 14 in accordance with IF signal level, thereby controlling the blanking rate. This is done without contributing intermodulation producing signals which could degrade receiver performance. Signals developed at source 24 of FET IF amplifier 23 are coupled through DC blocking capacitor 51 to gate 55 of FET amplifier 56 in level sensing circuit 50. Resistor 57 coupled between gate 55 and ground potential acts to hold the potential at gate 55 constant. Resistor 59 and capacitor 60, coupled in parallel between source 58 of FET 56, and ground potential, provide the bias potential at source 58 of FET amplifier 56. A DC supply potential is provided at terminal 63, and is coupled through RF choke 64, decoupling resistor 65, and bias resistor 66, to drain 61 of FET 56 to provide the necessary bias potential thereat. As FET amplifier 56 has high isolation characteristics and square law operating characteristics, it provides a minimal loading on IF amplifier 23, provides isolation between amplifier 23 and the remainder of level sensing circuit 50; and operates in a manner which tends to minimize development of intermodulation producing signals which can be caused by the connection of the level sensing circuit 50 to the IF stages of the receiver.

The amplified output of FET amplifier 56 is coupled from drain 61 through DC blocking capacitors 70 and 71 to input terminal 74 of IC amplifier 75. IC amplifier 75 may be a multistage bipolar transistor amplifier, which is capable of providing approximately 60 DB of gain or voltage amplification at the desired IF frequencies. In the preferred embodiment, IC amplifier 75 may be a standard unit which includes a pair of differential amplifiers which are sequentially connected to provide the desired amplification characteristics. Supply potential for IC amplifier 75 is coupled from terminal 63 through RF choke 64 and biasing resistor 76 to terminal 77 of amplifier 75. Capacitors 78, 79 and 80, coupled to terminals 77, 81 and 82 respectively, act as RF bypass capacitors for the circuitry in amplifier 75. A ground potential is coupled to IC amplifier 75 at terminal 83.

The amplified output signal from IC amplifier 75 is coupled from output terminal 84 through DC blocking capacitor 87 to base 90 of detector transistor 91. The network comprised of resistors 92, 93 and 94, and diode 96, which are coupled through biasing resistors 95 and 65, and RF choke 64 to supply voltage terminal 63, provides a temperature compensated bias to the base of transistor 91 in a known manner. Emitter 97 of transistor 91 is connected directly to ground potential, and collector 98 is connected to biasing resistor 95 which supplies operating potential. Capacitor 99 acts in association with biasing resistor 95 to develop a voltage thereacross which varies in accordance with the conduction of detector 91. Resistor 100 couples the level sensing voltage developed across capacitor 99, and therefore at collector 98 of transistor 91, to output terminal 101.

In operation, transistor 91 is biased to be normally nonconductive. Capacitor 99 develops a reference voltage thereacross when transistor 91 is nonconductive due to the charging currents supplied through resistor 95 from the supply voltage at terminal 63. The reference voltage with transistor 91 nonconductive, is 4.0 volts in the embodiment shown. The on-channel and adjacent channel signals at IF amplifier 23 are amplified by FET 56 and IC amplifier 75 and coupled to base 90 of transistor 91. When these signals exceed a predetermined level, the positive half cycles of the signals render transistor 91 conductive. With transistor 91 rendered conductive, a discharge path is provided for capacitor 99, discharging the voltage developed thereacross. Capacitor 99 and resistor 95 are selected such that capacitor 99 can partially recharge during that portion of the cycle when transistor 91 is nonconductive. As the signal level at amplifier 23 increases, transistor 91 will be rendered conductive for longer periods of time, causing a proportionate reduction in the voltage developed across capacitor 99. In the embodiment shown, an on-channel signal level at antenna 11 of approximately 15 microvolts will cause the voltage developed across capacitor 99 to begin to decrease. This voltage will decrease to 0.2 volts with an input signal level of 250 microvolts at antenna 11.

Noise amplifiers 31, 32, and 33 as previously stated, include dual gate MOSFET devices. In third noise amplifier 33, for example, as may also be the case in noise amplifiers 31 and 32, the level sensing voltage developed at terminal 101 is coupled to bias gate 43 of MOSFET 35. When the desired on-channel signals, and/or adjacent channel signals, and/or on-channel signals due to splatter, are below the above noted predetermined level, the voltage at terminal 101 is such that the bias voltage applied to gate 43 of MOSFET 35 causes MOSFET 35 to have a predetermined or normal amplification characteristic. When the desired on-channel signals, and/or adjacent channel signals, and/or undesired on-channel signals, increase above the predetermined level, the reduced voltage coupled to gate 43 from terminal 101 of level sensing circuit 50 causes a decrease in the amplification characteristics of MOSFET 35 and therefore third noise amplifier 33. As the gates of all three noise amplifiers are coupled to the level sensing voltage at terminal 101, a decrease thereat will decrease amplification characteristics of amplifiers 31, 32 and 33. The gain of all three noise amplifiers is varied in the same manner because by varying the gain of all three simultaneously, a much greater overall variation in amplification characteristics can be achieved than can be achieved by varying the amplification characteristic of a single stage. Varying the amplification characteristic of the noise amplifier stages makes the stages less susceptible to noise impulses of low amplitude, and therefore reduces the blanking rate. A reduction in the blanking rate causes a corresponding reduction in on-channel if energy produced by splatter, which results from the chopping of adjacent channel signals by the noise blanker. In the embodiment shown, the amplification characteristics of noise amplifiers 31, 32 and 33 can be varied over a dynamic range of 35 DB.

The above operation also allows the noise blanker to effectively blank impulse noise under both high and low input signal level conditions. That is, if strong signals are present in the IF, the noise channel gain is reduced so that only strong impulse noise disturbances are blanked. If weak signals are present in IF stage 23, which would be degraded by any impulse noise, the noise channel gain is increased so that all impulse noise disturbances produce blanking.

Although the level sensing circuit can reduce the blanking rate in response to an excessive signal level in the IF amplifier, an excessive on-channel or adjacent channel signal level in the IF amplifier, when coupled to level sensing circuit 50, and particularly to IC amplifier 75, can cause the production of intermodulation producing signals. These signals can be coupled back to intermediate frequency amplifiers 23 and 25 degrading the performance of the receiver.

As previously stated, should detector 91 in level sensing circuit 50 be rendered conductive in response to a predetermined amplitude of on-channel and adjacent channel IF signals, the voltage at collector 98 of transistor 91 will be reduced. This voltage will be coupled through resistor 115 to base 116 of transistor 117. Transistor 117 is normally rendered nonconductive by the bias voltage applied to emitter 118 through the voltage dividers consisting of resistors 119 and 120; and the voltage coupled from collector 98 of transistor 91 to base 116 of transistor 117. As the voltage coupled from collector 98 of transistor 91 decreases below a predetermined level, transistor 117 becomes forward biased, developing a voltage at collector 121. The voltage at collector 121 causes diode 122 to become forward biased, thus providing a signal path to ground for the signals coupled thereto from collector 61 of FET amplifier 56. The level of conduction of diode 122 varies in accordance with the voltage developed at collector 121 of transistor 117, and this varies in accordance with the level sensing voltage developed at collector 98. The RF path to ground provided by diode 122 prevents the on-channel, and adjacent channel signals coupled to IC amplifier 75 from exceeding an amplitude which would cause IC amplifier 75 to develop intermodulation producing signals which could cause receiver degradation. This in turn controls the voltage at terminal 101 to control the gain of the noise amplifier.

As can be seen, an improved impulse noise blanking circuit has been provided which has a high intermodulation rejection capability. The noise blanker circuit senses on-channel and adjacent channel signals within the circuit bandwidth and reduces the gain of the sampling channel in proportion to the level of these signals. A reduction in gain causes a reduction in blanking rate. This causes a corresponding reduction in splatter which produces undesired on-channel signals. Furthermore, the level sensing circuit includes feedback circuitry which prevents the level sensing circuit from contributing to the production of intermodulation producing signals which can degrade the receiver performance.

We claim:

1. An impulse noise blanking circuit for use in a radio receiver having a signal path which includes a first circuit for conducting and translating a desired signal which may be accompanied by undesired signals and impulse noise disturbances, a second circuit for repeating the desired signal, and a third circuit coupling said first circuit to said second circuit and which is adapted to be interrupted by the application of blanking pulses thereto, said impulse noise blanking circuit including in combination, amplifying means having a variable amplification characteristic for amplifying said impulse noise disturbances connected to said first circuit, pulse circuit means coupled to said amplifying means and operative in response to the impulse noise disturbances to develop blanking pulses, means coupling said blanking pulses from said pulse circuit means to said third circuit for applying said blanking pulses thereto to interrupt said third circuit, and a level sensing circuit including a first stage having a field effect transistor coupled to said second circuit for receiving said repeated signals therefrom, said level sensing circuit being adapted to develop a level sensing signal which varies in response to the level of the signal repeated by said second circuit, said level sensing circuit being coupled to said amplifying means for coupling said level sensing signal thereto, said amplifying means being responsive to said level sensing signal to vary the amplification characteristic thereof, said level sensing circuit further including circuit means operative in response to said level sensing signal exceeding a predetermined level to reduce the level of said repeated signals in said level sensing circuits.

2. The impulse noise blanking circuit of claim 1 wherein said level sensing circuit includes, a second stage coupled to said field effect transistor and being operative to amplify said repeated and amplified signals, said second stage including at least one bipolar transistor, and a detector stage coupled to said second stage and operative in response to the signals coupled thereto to develop a level sensing signal which varies in accordance with the level of said repeated signals.

3. The impulse noise blanking circuit of claim 2 wherein said circuit means operative in response to said level sensing signal includes feedback circuit means coupled to said stages thereof and operative in response to said level sensing signal exceeding a predetermined level to reduce the level of said repeated signals in said level sensing circuit.

4. The impulse noise blanking circuit of claim 3 wherein said feedback circuit means includes, diode means coupled to said second stage and to a reference potential, and circuit means coupling said level sensing signal to said diode means, said diode means being rendered conductive in response to said level sensing signal exceeding a predetermined level for providing a conduction path to said reference potential for said repeated and amplified signals, said diode conduction varying in accordance with said level sensing signal to reduce the level of said repeated and amplified signals coupled to said second stage.

5. The impulse noise blanking circuit of claim 4 wherein said amplifying means includes, at least one stage having a field effect transistor, having gate, drain and source electrodes, said level sensing signal being coupled to said gate electrode to vary the amplification characteristics thereof.

6. The impulse noise blanking circuit of claim 5 wherein said second circuit includes, a field effect transistor amplifier having gate, drain and source electrodes, said gate electrode being coupled to said third circuit for receiving the desired signals therefrom, said drain electrode being coupled to said level sensing circuit for coupling the repeated signals thereto.

7. The impulse noise blanking circuit of claim 6 wherein said detector stage includes, first transistor means having a base, emitter and collector electrode, said base electrode being coupled to said second stage for receiving amplified repeated signals therefrom, bias circuit means coupled to said electrodes for applying a bias voltage thereto, reactance means coupled to said collector electrode and to the reference potential, said reactance means developing said level sensing signal thereacross, said first transistor means being rendered operative in response to said signals coupled thereto for varying the level sensing signal developed across the said reactance means.

8. The impulse noise blanking circuit of claim 7 wherein said feedback circuit means includes, second transistor means coupled to said first transistor means collector electrode and to said diode means, said second transistor means operative in response to said level sensing signal exceeding said predetermined level to render said diode means conductive.

9. The impulse noise blanking circuit of claim 8 wherein said second stage of said level sensing circuit is constructed in integrated circuit form.

* * * * *